(12) United States Patent
Dios

(10) Patent No.: US 10,293,302 B2
(45) Date of Patent: May 21, 2019

(54) HUMIDITY ABSORBER

(71) Applicant: HUMEX, S.A., La Canonja (Tarragona) (ES)

(72) Inventor: Eva Schmidt Dios, La Canonja (ES)

(73) Assignee: HUMEX, S.A., La Canonja (Tarragona) (ES)

(*) Notice: Subject to any disclaimer, the term of this patent is extended or adjusted under 35 U.S.C. 154(b) by 0 days.

(21) Appl. No.: 15/557,968

(22) PCT Filed: Mar. 23, 2015

(86) PCT No.: PCT/ES2015/070205
§ 371 (c)(1),
(2) Date: Sep. 13, 2017

(87) PCT Pub. No.: WO2016/151152
PCT Pub. Date: Sep. 29, 2016

(65) Prior Publication Data
US 2018/0050299 A1    Feb. 22, 2018

(51) Int. Cl.
*B01D 53/26* (2006.01)
*B01D 53/04* (2006.01)
*B01J 20/28* (2006.01)
*B65D 81/26* (2006.01)
*F17C 11/00* (2006.01)

(52) U.S. Cl.
CPC ....... *B01D 53/261* (2013.01); *B01D 53/0415* (2013.01); *B01J 20/2805* (2013.01); *B01D 2257/80* (2013.01); *B01D 2259/4541* (2013.01); *B65D 81/264* (2013.01)

(58) Field of Classification Search
CPC ........................... B01J 20/2805; B01D 53/261

USPC ......... 206/204; 24/366, 375, 578.17, 585.12, 24/592.1, 588.1
See application file for complete search history.

(56) References Cited

U.S. PATENT DOCUMENTS

| | | | | |
|---|---|---|---|---|
| 3,376,618 A | * | 4/1968 | Schwarzkopf | A44B 17/0029 24/618 |
| 4,856,650 A | * | 8/1989 | Inoue | A23L 3/3436 206/204 |
| 2012/0061261 A1 | * | 3/2012 | Hsu | B01D 53/261 206/204 |
| 2013/0213827 A1 | * | 8/2013 | Hammad | B65D 81/2023 206/204 |

(Continued)

FOREIGN PATENT DOCUMENTS

| | | |
|---|---|---|
| WO | 2005/087364 A1 | 9/2005 |
| WO | 2012/093186 A1 | 7/2012 |
| WO | WO 2012093186 A1 * | 7/2012 ........... B01D 53/261 |

OTHER PUBLICATIONS

Jun. 22, 2015—(WO) International Search Report—App PCT/ES2015/070205.

*Primary Examiner* — Rafael A Ortiz
(74) *Attorney, Agent, or Firm* — Banner & Witcoff, Ltd.

(57) ABSTRACT

Humidity absorber that does not drip, occupies a small space and can be reused, usable both outdoors and indoors, comprising a bag that houses a sack that in turn contains a hygroscopic material, the bag being made of a 3D spacer material configuring a single cavity that houses the sack, provided with an opening having closing means, the opening allowing the sack to be introduced in the cavity or removed from the same such that the sack with hygroscopic material can be replaced to reuse the absorber.

4 Claims, 2 Drawing Sheets

(56) References Cited

U.S. PATENT DOCUMENTS

| | | | |
|---|---|---|---|
| 2014/0021074 A1* | 1/2014 | Kranz | B65D 77/06 |
| | | | 206/204 |
| 2014/0338538 A1* | 11/2014 | Tornel Garcia | B01D 53/0407 |
| | | | 96/118 |
| 2015/0313337 A1* | 11/2015 | Swartzel | A45C 13/30 |
| | | | 150/108 |

* cited by examiner

HUMIDITY ABSORBER

The present application is a U.S. National Phase Application under 35 U.S.C. § 371 of PCT/ES2015/070205 filed Mar. 23, 2015 which is incorporated by reference herein in its entirety.

FIELD OF THE INVENTION

The present invention belongs to the field of humidity absorbers, specifically those configured as a bag housing a sack with hygroscopic material.

BACKGROUND OF THE INVENTION

In humid atmospheres it is desirable to absorb humidity for personal comfort reasons and to prevent deterioration due to mould and the like.

Humidity absorbers or dehumidifiers are known consisting of a container with a lid and a hygroscopic material that absorbs the humidity. When said material is saturated it becomes liquid, requiring opening the container, remove the liquid with the corresponding inconvenience and risk of spilling liquid and, when possible, replacing the hygroscopic material; in addition, these absorbers generally occupy a volume such that they can only be placed on stable surfaces such as tables, shelves, etc.

Also known are absorbers that consist in a bag with two superimposed cavities, the hygroscopic material being placed on the upper cavity and the water being collected in the bottom cavity. The drawback of this invention is that it occupies a large volume, and that reusing requires removing the liquid formed and replacing the hygroscopic material in flexible bags, with the corresponding difficulty and inconvenience.

The present invention overcomes the aforementioned drawbacks to meet the need for a humidity absorber that does not drop, occupies a small volume, and can be reused by a convenient and effective replacement of the hygroscopic material.

DESCRIPTION OF THE INVENTION

The present invention is defined and characterised by the independent claims, the dependent claims describing additional features thereof.

The subject matter of the invention relates to a humidity absorber that does not drip, occupies a small volume, and can be reused when the hygroscopic material is saturated, which can be used both outdoors and indoors, including inside closets or vehicles. The technical problem to solve is configuring a humidity absorber in the form of a bag having a configuration of the various parts thereof that fulfils said aim.

The term '3D spacer fabric' relates to known fabrics known as such formed by two parallel fabric layers joined by fabric threads, forming instead of a flat structure with a small thickness, or two-dimensional, a structure with a considerable thickness or three-dimensional structure.

One advantage of the absorber is that, due to the configuration of the 3D fabric, it is breathable. In addition, it is observed that due to the great number of threads of the fabric, if a drop of moisture is formed in the absorber it will be retained in the fabric threads, so that no dripping will occur.

Another advantage resulting from the configuration of the 3D fabric is its soft and pleasant feel, and the possibility of configuring various visual designs from the fabric pattern.

A further advantage is that reuse of the absorber is very simple and drip-free as this involves removing a closed sack from the bag and replacing it with another sack.

Yet another advantage is that as it contains a single cavity the absorber has a relatively small size and can be placed in any outdoor location and practically any indoor location, regardless of how narrow the location is.

An additional advantage relates to the simplicity of the configuration, which allows obtaining an inexpensive product since it is no more than a bag with an opening having closing means.

An additional advantage resulting from the opening is that it is possible to see when the hygroscopic material is saturated and must be replaced without having to open the bag.

Yet another additional advantage resulting from the inclusion of hanging means, such as those including a hook in the form of a coat hanger, is that the device can be placed hanging in any location, such as an outdoor balustrade, a closet bar, or a vehicle handle.

BRIEF DESCRIPTION OF THE FIGURES

The present specification is completed by a set of figures that illustrate a preferred embodiment without limiting the invention in any way.

DETAILED DESCRIPTION OF A PREFERRED EMBODIMENT

Figure 1:
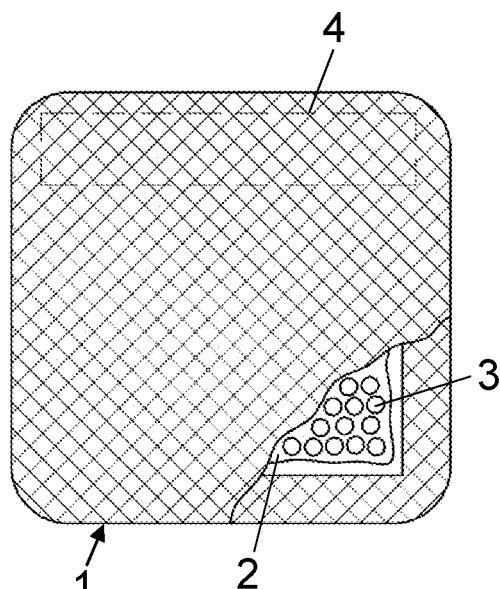
FIG. 1 is a plan view of the bag with Velcro® straps closing means, showing a partial cross section to reveal the sack containing the hygroscopic material.

An embodiment of the invention is described below with reference to the figures.

The figures show a humidity absorber comprising a bag (1) that houses a sack (2) which in turn contains a hygroscopic material (3); the bag (1) is made of a 3D spacer fabric, configuring a single cavity that contains the sack (2) and has an opening (1.1) with closing means (4). The opening (1.1) allows placing the sack (2) in the cavity or extracting the sack (2) therefrom, such that the sack (2) with hygroscopic material (3) can be replaced to reuse the absorber.

Optionally, the hygroscopic material (3) is in the form of granules and a portion of the sack (2) is made of a material that is breathable and liquid-proof, such as Tyvek®, not shown in the figures.

Figure 3:
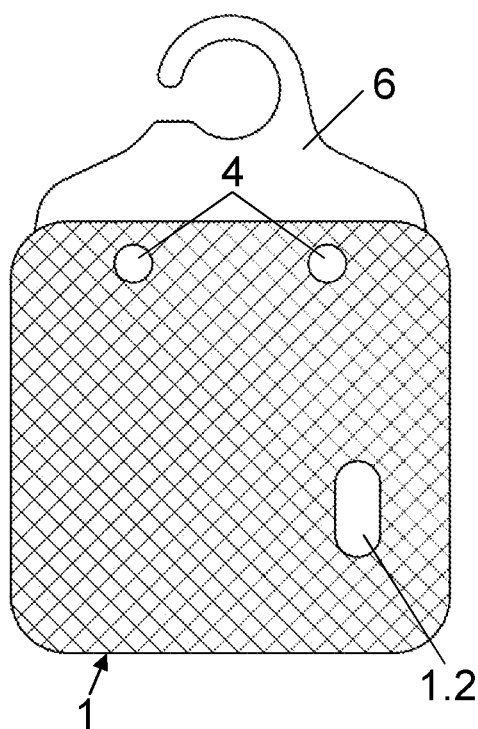
FIG. 3 shows a plan view of the bag with snap fastener closing means and hanging means with a hook, in the form of a coat hanger.

Optionally, as shown in FIG. 3, the bag (1) presents an opening (1.2) through which can be seen the sack (2) with hygroscopic material (3). Said opening can be open or closed by a transparent or translucent film, such as a PVC film.

Figure 2:
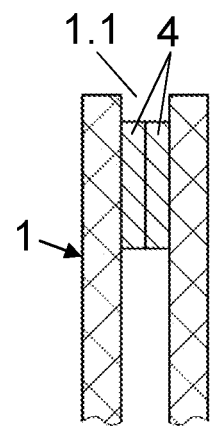
FIG. 2 is an enlarged view of a detail of FIG. 1 showing a cross section of the Velcro® strap closing means.

One option is that the closing means (4) are Velcro® straps or hook and loop means, as shown in FIGS. 1 and 2. In this way, the opening (1.1) opens and closes as often as desired in a simple manner. Another option is for the closing means (4) to be snap fasteners, as shown in FIGS. 3 and 4.

Figure 4:
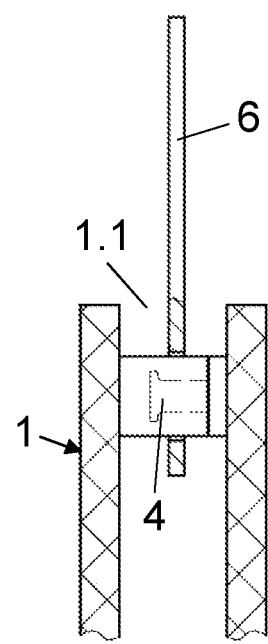
FIG. 4 shows an enlarged view of a detail of FIG. 3 showing a cross section of the snap fastener closing means and the attachment means for the hanging means.
Figure 5:
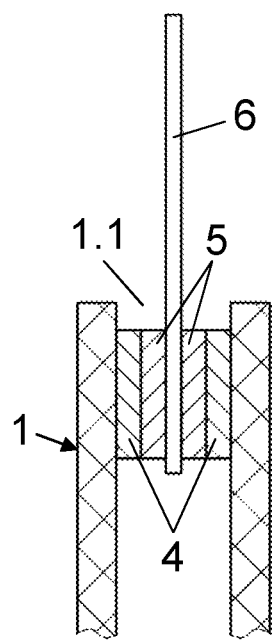
FIG. 5 shows an enlarged view of a detail of a variant of FIG. 4 where the bag closing means are as those of FIGS. 1 and 3, Velcro® straps, and the attachment means for the hanging means are also Velcro® straps.
Figure 6:
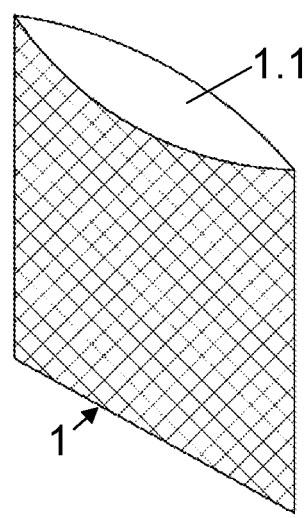
FIG. 6 shows a perspective view of a bag with a quadrangular configuration.
Figure 7:
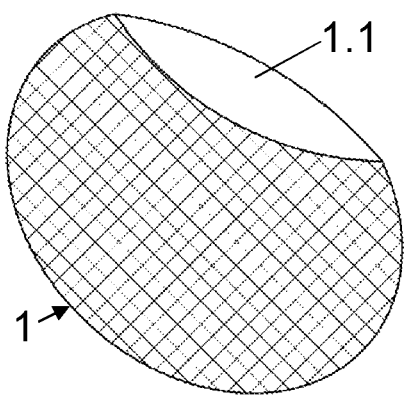
FIG. 7 shows a perspective view of a bag with a circular configuration.

Advantageously, it is possible to add hanging means (6), FIGS. 3 to 5, attached to the opening (1.1) by attachment means (5) compatible with the closing means (4) of the opening (1.1). 'Compatible' is understood here to mean that when the closing means (4) in the opening (1.1) are Velcro® straps, FIG. 5, the attachment means (5) are Velcro® straps, opposite each other such that they can engage. That is, a hook type strap, for example, in the closing means (4) will be opposite a loop type strap in the attachment means (5).

Similarly, when the closing means (4) are snap fasteners, compatibility means that the closing means (5) include forms to house said snap fasteners, specifically orifices in the hanging means (6) that the snap fasteners cross, FIG. 4.

Typically, the hanging means (6) comprise a hook-like configuration giving rise, for example, to a type of coat hanger, FIG. 3.

Normally, the 3D fabric is polyethylene, polypropylene, polyester or polyamide, although it can be made of any other material or combination of the aforementioned materials.

Moreover, for reasons of styling or due to requirements of the space in which the absorber is placed, the peripheral line of the bag (1) can have any shape, normally quadrangular or circular due to their simplicity of construction, although it can also be pentagonal, hexagonal or any other shape.

The invention claimed is:

1. A humidity absorber, comprising:

a bag housing a sack that contains a hygroscopic material, the bag being constructed of a 3D spacer fabric forming a single cavity that houses the sack therein, the bag having an exterior surface and an interior surface, the interior surface being disposed in the single cavity; the 3D spacer fabric being breathable configured to enable moisture to enter into the single cavity through the 3D spacer fabric;

the 3D spacer fabric being configured to retain liquid moisture, when the hygroscopic material is saturated within the single cavity so as to prevent excess moisture from dripping from the exterior surface of the bag, the bag having a movable opening with a closing system mounted to the 3D spacer fabric configured to allow inserting of the sack in the single cavity or removing of the sack therefrom, when the closing system is released in an opened configuration and configured to retain the sack in the single cavity when the closing system is in a closed configuration, such that the sack with hygroscopic material can be replaced to reuse the humidity absorber;

wherein the bag further comprises a window opening extending through the exterior surface to the interior surface of the 3D spacer fabric in which a part of the sack with hygroscopic material can be seen within the single cavity; the window opening comprising a transparent or translucent film;

further comprising a hanging element being releasably attached to the bag within the movable opening, the hanging element having an attachment system compatible with the closing system of the movable opening such that the attachment system enables the hanging element to engage the closing system, while the moveable opening is in the closed configuration or removed from the closing system, while the movable opening is in the open configuration.

2. The Absorber according to claim 1, wherein the closing system comprises releasable hook and loop straps being mounted to the interior surface of the bag forming the movable opening and the attachment system comprises releasable hook and loop straps attached to the hanging element.

3. The Absorber according to claim 1, wherein the closing system are snap fasteners and the attachment system further comprises orifices in the hanging element, the snap fasteners of the closing system being disposed in said orifices.

4. The Absorber according to claim 1, wherein the hanging element comprises a hook configuration.

* * * * *